United States Patent
Russell

(10) Patent No.: US 11,694,300 B2
(45) Date of Patent: *Jul. 4, 2023

(54) WARPING FOR SPATIAL LIGHT MODULATING DISPLAYS USING EYE TRACKING

(71) Applicant: Magic Leap, Inc., Plantation, FL (US)

(72) Inventor: Andrew Ian Russell, Weston, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,979

(22) Filed: Sep. 12, 2022

(65) Prior Publication Data

US 2023/0005099 A1    Jan. 5, 2023

Related U.S. Application Data

(63) Continuation of application No. 17/326,036, filed on May 20, 2021, now Pat. No. 11,481,870.

(60) Provisional application No. 63/028,418, filed on May 21, 2020.

(51) Int. Cl.
  *G06T 3/00* (2006.01)
  *G06F 3/01* (2006.01)

(52) U.S. Cl.
  CPC .......... *G06T 3/0093* (2013.01); *G06F 3/012* (2013.01); *G06F 3/013* (2013.01)

(58) Field of Classification Search
  CPC .......... G06F 3/012; G06F 3/011; G06F 3/013; G06T 3/0093

See application file for complete search history.

(56) References Cited

U.S. PATENT DOCUMENTS

| | | |
|---|---|---|
| 8,970,495 B1 | 3/2015 | Biffle et al. |
| 9,406,166 B2 | 8/2016 | Futterer |
| 11,481,870 B2 | 10/2022 | Russell |
| 2014/0185142 A1 | 7/2014 | Gupta et al. |
| 2019/0156100 A1 | 5/2019 | Rougeaux et al. |
| 2019/0260931 A1 | 8/2019 | Rodriguez et al. |
| 2019/0287495 A1 | 9/2019 | Mathur et al. |
| 2020/0041802 A1 | 2/2020 | Osterhout et al. |

(Continued)

OTHER PUBLICATIONS

U.S. Appl. No. 17/326,034, "Final Office Action", dated Oct. 6, 2022, 23 pages.

(Continued)

*Primary Examiner* — Muhammad N Edun
(74) *Attorney, Agent, or Firm* — Kilpatrick Townsend & Stockton LLP

(57) ABSTRACT

Embodiments shifts the color fields of a rendered image frame based on the eye tracking data (e.g. position of the user's pupils). An MR device obtains a first image frame having a set of color fields. The first image frame corresponds to a first position of the pupils of the viewer. The MR device then determines a second position of the pupils of the viewer based on, for example, data receive from an eye tracking device coupled to the MR device. The MR device generates, based on the first image frame, a second image frame corresponding to the second position of the pupils. The second image frame is generated by shifting color fields by a shift value based on the second position of the pupils of the viewer. The MR device transmits the second image frame to a display device of the MR device to be displayed thereon.

20 Claims, 16 Drawing Sheets

(56) References Cited

U.S. PATENT DOCUMENTS

2021/0366077 A1 11/2021 Russell
2021/0366334 A1 11/2021 Russell

OTHER PUBLICATIONS

U.S. Appl. No. 17/326,034, "Non-Final Office Action", dated May 26, 2022, 17 pages.
U.S. Appl. No. 17/326,036, "Non-Final Office Action", dated Mar. 23, 2022, 11 pages.
U.S. Appl. No. 17/326,036, "Notice of Allowance", dated Jun. 13, 2022, 5 pages.
Application No. PCT/US2021/033503, "International Preliminary Report on Patentability", dated Dec. 1, 2022, 6 pages.
Application No. PCT/US2021/033503, "International Search Report and Written Opinion", dated Aug. 24, 2021, 7 pages.
Application No. PCT/US2021/033504, "International Preliminary Report on Patentability", dated Dec. 1, 2022, 6 pages.
Application No. PCT/US2021/033504, "International Search Report and Written Opinion", dated Aug. 24, 2021, 7 pages.
U.S. Appl. No. 17/326,034, "Notice of Allowance", dated Jan. 26, 2023, 9 pages.

WARPING FOR SPATIAL LIGHT MODULATING DISPLAYS USING EYE TRACKING

CROSS-REFERENCES TO RELATED APPLICATIONS

This application is a continuation of U.S. patent application Ser. No. 17/326,036, filed May 20, 2021, now U.S. Pat. No. 11,481,870, issued Oct. 25, 2022, entitled "WARPING FOR SPATIAL LIGHT MODULATING DISPLAYS USING EYE TRACKING," which claims the benefit of priority to U.S. Provisional Patent Application No. 63/028,418, filed May 21, 2020, entitled "WARPING FOR SPATIAL LIGHT MODULATING DISPLAYS USING EYE TRACKING," the entire disclosures of which are hereby incorporated by reference, for all purposes, as if fully set forth herein.

The following regular U.S. Patent Applications were filed concurrently, and the entire disclosure of the other applications are incorporated by reference into this application for all purposes:

U.S. patent application Ser. No. 17/326,036, filed May 20, 2021, entitled "WARPING FOR SPATIAL LIGHT MODULATING DISPLAYS USING EYE TRACKING;" and U.S. patent application Ser. No. 17/326,034, filed May 20, 2021, entitled "WARPING FOR LASER BEAM SCANNING DISPLAYS USING EYE TRACKING."

BACKGROUND

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real world around the user (i.e., transparency to real-world visual input). Accordingly, AR scenarios involve presentation of digital or virtual image information with transparency to the real-world visual input.

MR systems typically employ wearable display devices (e.g., head-worn displays, helmet-mounted displays, or smart glasses) that are at least loosely coupled to a user's head. MR systems typically generate and display color data, which increases the realism of MR scenarios. Various optical systems generate images, including color images, at various depths for displaying MR (VR and AR) scenarios.

According to various scenarios, the user may change the position of their head or simply their eyes (i.e., their gaze). Changes in viewer's head and/or pupil position present challenges to spatial light modulating display technology and introduces artefacts, such as color breakup, on the displayed images.

SUMMARY

Described herein are techniques and technologies to improve image quality of spatial light modulating displays subject to user moving their eyes, thereby modifying their direction of gaze (e.g. line of sight).

As an example, if a user wearing a head-worn display device views a virtual object and moves their eyes to look at a different direction (e.g. follows the virtual object when the virtual object moves, or chooses to look at a different object), the virtual object can be rendered based on the user's field of view as determined by the position of their pupils. A change in a user's pupil position requires adjusting how color fields of an image frame will be displayed on the spatial light modulating displays.

Embodiments may shift one or more of the color fields of a rendered image frame based on the eye tracking data associated with the position of the user's pupils. One or more processors coupled to the MR device may obtain a first image frame having a set of color fields, wherein the first image frame corresponds to a first view perspective associated with a first position of the pupils of the viewer. The processor(s) may then determine a second position of the pupils of the viewer based on, for example, data receive from an eye tracking device coupled to the MR device. The processor(s) may then generate, based on the first image frame, a second image frame corresponding to a second view perspective associated with the second position of the pupils of the viewer. For example, the processor(s) may shift one or more color fields of the set of color fields by a shift value based on the second position of the pupils of the viewer. The processor(s) may then transmit the second image frame to a near-eye display device of the MR device to be displayed on the near-eye display device. All six color fields of the second image frame are displayed on the a same spot relative to the second position of the pupils of the viewer. According to various embodiments, a first color field of the set of color fields of the first image frame may be shifted at a first shift value and a second color field may be shifted at a second shift value. The first value and the second value are determined based on the first and second positions of the pupils of the viewer.

Some embodiments provide a method for transforming an image frame based on a position of pupils of a viewer. The method may include obtaining, by a computing device, a first image frame having a set of color fields. The first image frame corresponds to a first view perspective associated with a first position of the pupils of the viewer. The method may also include determining, by the computing device, a second position of the pupils of the viewer. The computing device may generate, based on the first image frame, a second image frame corresponding to a second view perspective associated with the second position of the pupils of the viewer. The generating may include shifting one or more color fields of the set of color fields by a shift value based on the second position of the pupils of the viewer. The method may also include transmitting, by the computing device, the second image frame to a near-eye display device to be displayed on the near-eye display device. All six color fields of the second image frame are displayed on the a same spot relative to the second position of the pupils of the viewer. In some embodiments, the first view perspective is also associated with a first head position of the viewer, the method further comprising: estimating, by the computing device, a second head position of the viewer. An intermediary warped image frame may be generated from the first image frame using the second head position of the viewer. The second image frame is generated using the intermediary warped image frame.

In some embodiments, the method may also include receiving, by the computing device from an eye tracking device, data associated with the position of the pupils of the viewer, wherein the second position of the pupils is determined based on the data received from the eye tracking device.

In some embodiments, the method may also include calculating an eye velocity as a function of the first position of the pupils, the second position of the pupils and a time elapsed for the pupils of the viewer to get from the first position to the second position. The eye velocity is calculated with respect to the near-eye display device. The method may also include calculating, by the computing device, the shift value based on the eye velocity.

Various embodiments provide a system including one or more processors for performing the method for transforming an image frame based on a position of pupils of a viewer, as described above.

Embodiments provide a non-transitory computer-readable medium having stored thereon a sequence of instructions which, when executed by one or more processors, causes the processors to execute the method for transforming an image frame based on a position of pupils of a viewer, as described above.

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION

The present disclosure relates to spatial light modulating display systems projecting image frames including a set of color fields shifted using a shift value calculated based on eye tracking data for eliminating visual artefacts such as color breakup, and methods for generating a mixed reality experience content using the same.

Various embodiments of the disclosure are directed to systems, methods, and articles of manufacture for enhanced warping virtual content using data from an eye tracking device for a spatial light modulating display device. Other objects, features, and advantages of the disclosure are described in the detailed description, figures, and claims.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Illustrative Mixed Reality Scenario and System

The description that follows pertains to an illustrative augmented reality system with which the eye tracking enhanced warping system may be practiced. However, it is to be understood that the embodiments also lends themselves to applications in other types of display systems (including other types of mixed reality systems), and therefore the embodiments are not to be limited to only the illustrative system disclosed herein.

Figure 1:
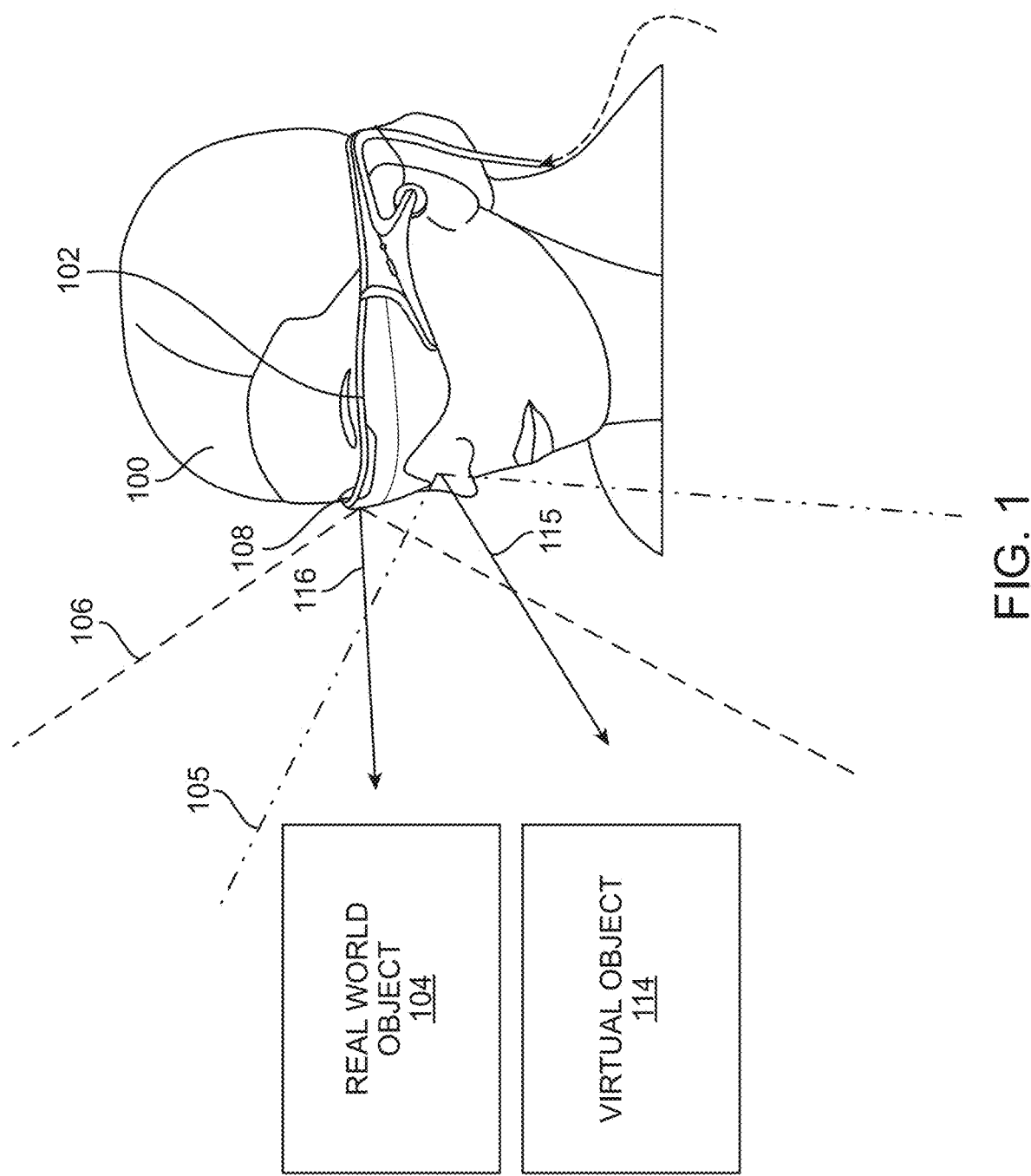
FIG. 1 schematically depicts an exemplary mixed reality (e.g., VR or AR) system with a real world object and a virtual object in the user's field of view, according to some embodiments.

Mixed reality (MR) scenarios often include presentation of virtual content (e.g., color images and sound) corresponding to virtual objects in relationship to real-world objects. For example, referring to FIG. 1, a user 100 of an MR device 102 including a headset (e.g. wearable component) sees a real-world, physical object 104. According to various embodiments, a virtual object 114 may be rendered on a near-eye display device of the MR device 102 with respect to the real-world object 104. For example, the real-world object 104 may be in the form of a table, and a virtual fairy (as an exemplary virtual object 114) may be rendered on the display device as being placed on the table. The MR device 102 must also account for the user's gaze (e.g. line of sight) used to generate/render the real-world object 104 as well as the virtual object 114. For example, the user 100 may move their eyes from a first position providing a first field of view 105 to a second position providing a second field of view 106. While the position of the real-world object 104 remains the same with respect to the real-world coordinates, the position of the real-world object 104 shifts within the field of view of the user (e.g. the real-world object 104 is closer to the edge of the first field of view 105 and is in the middle of the second field of view 106). Unless properly processed, the change in user's pupil position may result in the virtual object 114 to appear blurred or having color breakup (as discussed below in greater detail) on near-eye display device of the MR device 102.

According to various embodiments, data from an eye tracking device 108 coupled to the MR device 102 may be used to render the virtual object 114 properly on the near-eye display device. Such eye tracking data may, for example, be discerned by projecting light at the end user's eyes, and detecting the return or reflection of at least some of that projected light. The eye tracking device 108 may output the pixel index of the display device where the user's gaze is directed at. For example, the eye tracking device 108 may determine a first position of the user's pupils as the center pixel of the display device at time $t_1$ and a second position of the user's pupils as 10 pixels to the right of the center pixel at time $t_2$. According to some embodiments, the MR device 102 may be able to calculate the eye velocity for the user as a function of the first position, the second position and the difference $\Delta t$ between time $t_1$ and time $t_2$.

For example, the MR device 102 may obtain a first image frame having a set of color fields (e.g. red, green, blue) when the user's pupils are at the first position (illustrated by normal vector 115 to user's pupils) associated with the first field of view 105. The MR device 102 may receive data from the eye tracking device 108 and determine a second position (illustrated by normal vector 116 to user's pupils) of the user's pupils associated with the second field of view 106 using the data from the eye tracking device 108. The MR device 102 may then generate a second image frame corresponding to the second field of view 106 by performing, among other steps, a shift of the one or more color fields of the first image frame based at least on the first position, and the second position of the user's pupils. The details of the shift, as well as the additional steps that may be performed, are described below in greater detail.

The following description provides five exemplary scenarios where the eye tracking data may be used to correct visual artefacts/anomalies/glitches resulting from the user of the MR device shifting their gaze (e.g. position of their pupils). The gaze shift may be in addition to a head pose change or may be by itself (e.g. user changes their gaze without moving their head). According to various embodiments, an eye tracking based shift may performed as a stand-alone correction or may be performed in addition to a head pose based warp (e.g. the eye tracking based shift may be performed on the head pose based warped image).

Figure 2:
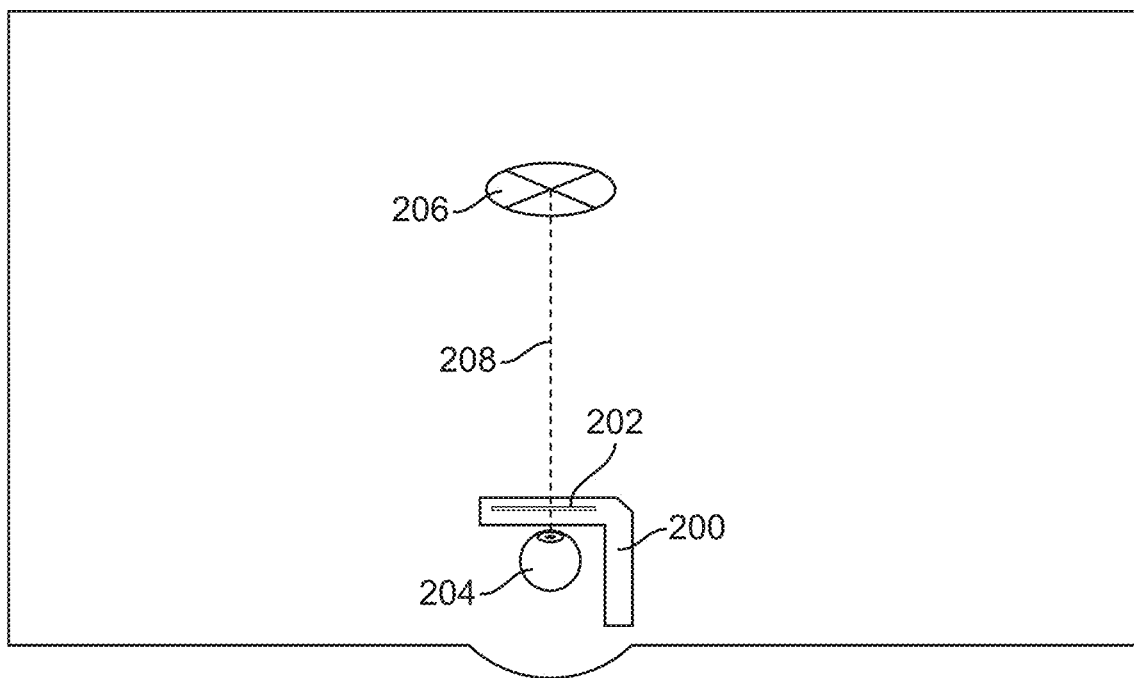
FIG. 2 schematically depicts an exemplary mixed reality system illustrating the user's eyeball with a real world or virtual object in the user's line of sight, according to some embodiments.

FIG. 2 is a schematic representation of an exemplary AR/VR headset 200 with respect to an eyeball of a user of the headset 200. The headset 200 includes a display device 202 (e.g. a spatial light modulating display) which is positioned in front of the user's eyeball 204. An eye tracking device coupled to the headset 200 may track the position of the user's eyeball 204 (e.g. user's pupils). The user's line of sight 208 may be directed to a real or a virtual object 206.

Figure 3:
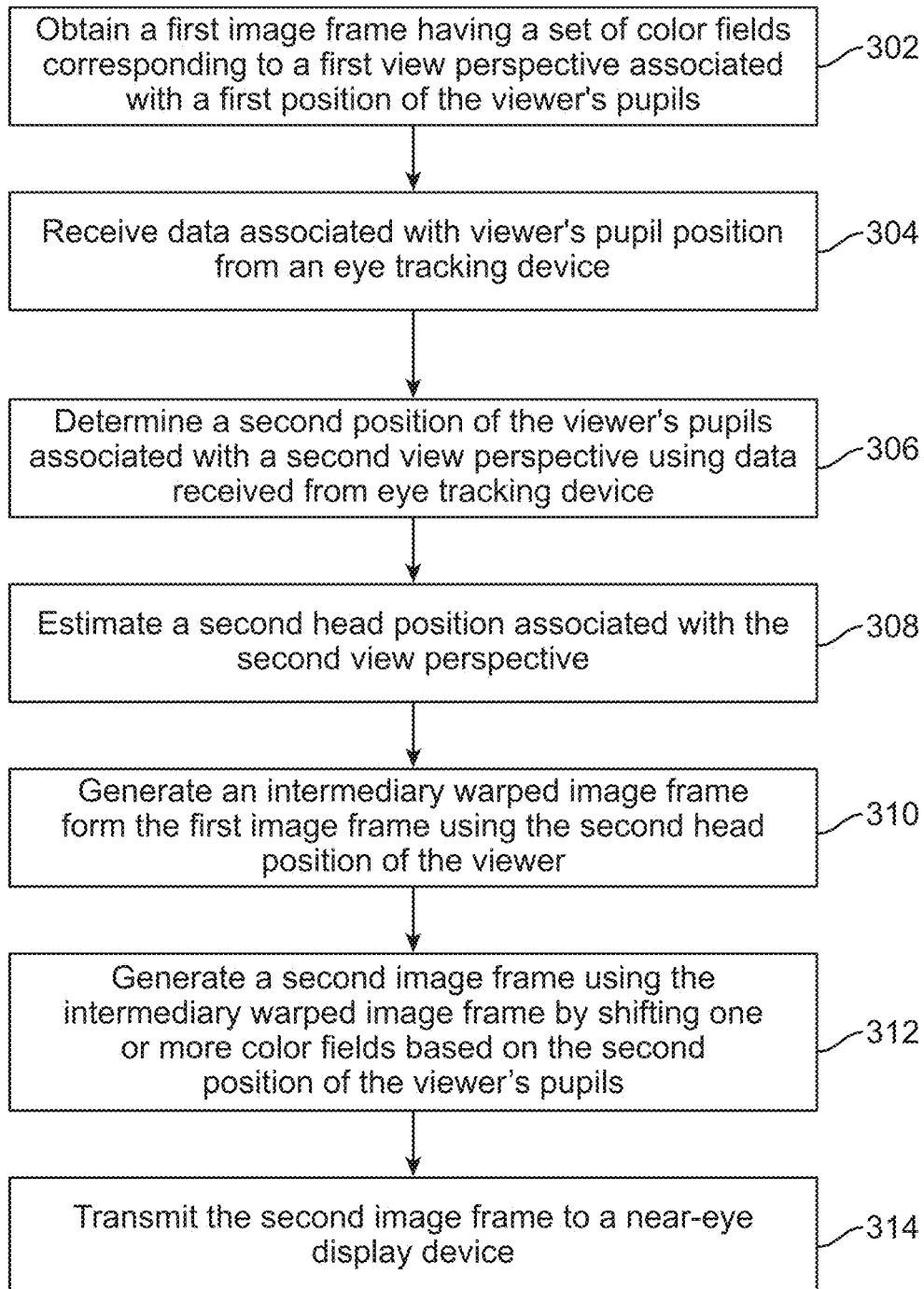
FIG. 3 illustrates an exemplary method for transforming an image frame based on a position of pupils of a user (e.g. a viewer), according to some embodiments.

According to various embodiments, data from the eye tracking device may be used to correctly render the real or a virtual object 206 on the display device 202 based on the user's line of sight or any change in the user's line of sight. FIG. 3 illustrates an exemplary method for transforming an image frame based on a position of pupils of a user (e.g. a viewer).

At step 302, the computing device obtains a first image frame having a set of color fields. The first image frame may have six color fields and may correspond to a first view perspective associated with a first position of the pupils of the viewer. According to various embodiments, the computing device may be coupled to a near-eye display device including a spatial light modulating display.

At step 304, the computing device may receive data associated with the viewer's pupil position from an eye tracking device coupled to the headset that the viewer is wearing.

At step 306, the computing device may determine a second position of the pupils of the viewer based on the data received from the eye tracking device. The second position of the viewer's pupils is associated with the second view perspective. In some embodiments, the position of the viewer's pupils may be determined with respect to a head position of the viewer. In other embodiments, the position of the viewer's pupils may be determined with respect to the headset (e.g. with respect to the pixels of the display device of the headset).

At step 308, the computing device may estimate a second head position that is also associated with a second view perspective.

At step 310, the computing device may generate an intermediary warped image frame from the first image frame using the second head position of the viewer. Accordingly, the intermediary warped image is generated using head pose based warp.

At step 312, the computing device generate, based on the first image frame (e.g. using the intermediary warped image frame which is generated from the first image frame), a second image frame corresponding to the second view perspective associated with the second position of the pupils of the viewer. The second image frame may be generated by shifting one or more color fields of the set of color fields by a shift value based on the second position of the pupils of the viewer.

According to various embodiments, the computing device may calculate an eye velocity for the viewer as a function of the first position of the pupils, the second position of the pupils and a time elapsed for the pupils of the viewer to get from the first position to the second position. In some embodiments, the eye velocity is calculated with respect to the headset (e.g. with respect to the pixels of the display device of the headset). The computing device may then calculate the shift value based on the eye velocity. In some embodiments, all six color fields of the first image frame may be shifted by the same shift value. In other embodiments, a first color field may be shifted by a first shift value and a second color field may be shifted by a second shift value. It is possible to calculate six different shift values (e.g. a different shift value for each one of the six color fields) based on various pupil positions of the viewer.

At step 314, the computing device may transmit the second image frame to a near-eye display device to be displayed on the near-eye display device. All six color fields of the second image frame are displayed on the same spot on the display device relative to the second position of the pupils of the viewer. Therefore, while the first image frame may include a color breakup artefact, the color breakup is eliminated on the second image frame that is displayed on the display device.

Exemplary Scenario One

In the first exemplary VR scenario, a virtual object (e.g. a virtual fairy) appears in the peripheral field of view of the user. The user looks at the virtual object, and fixes their gaze on the virtual object while the user turns their head/neck to face the virtual object. While the user rotates their head, the virtual object remains stationary, and the user's gaze is fixed on the virtual object.

Figure 4:
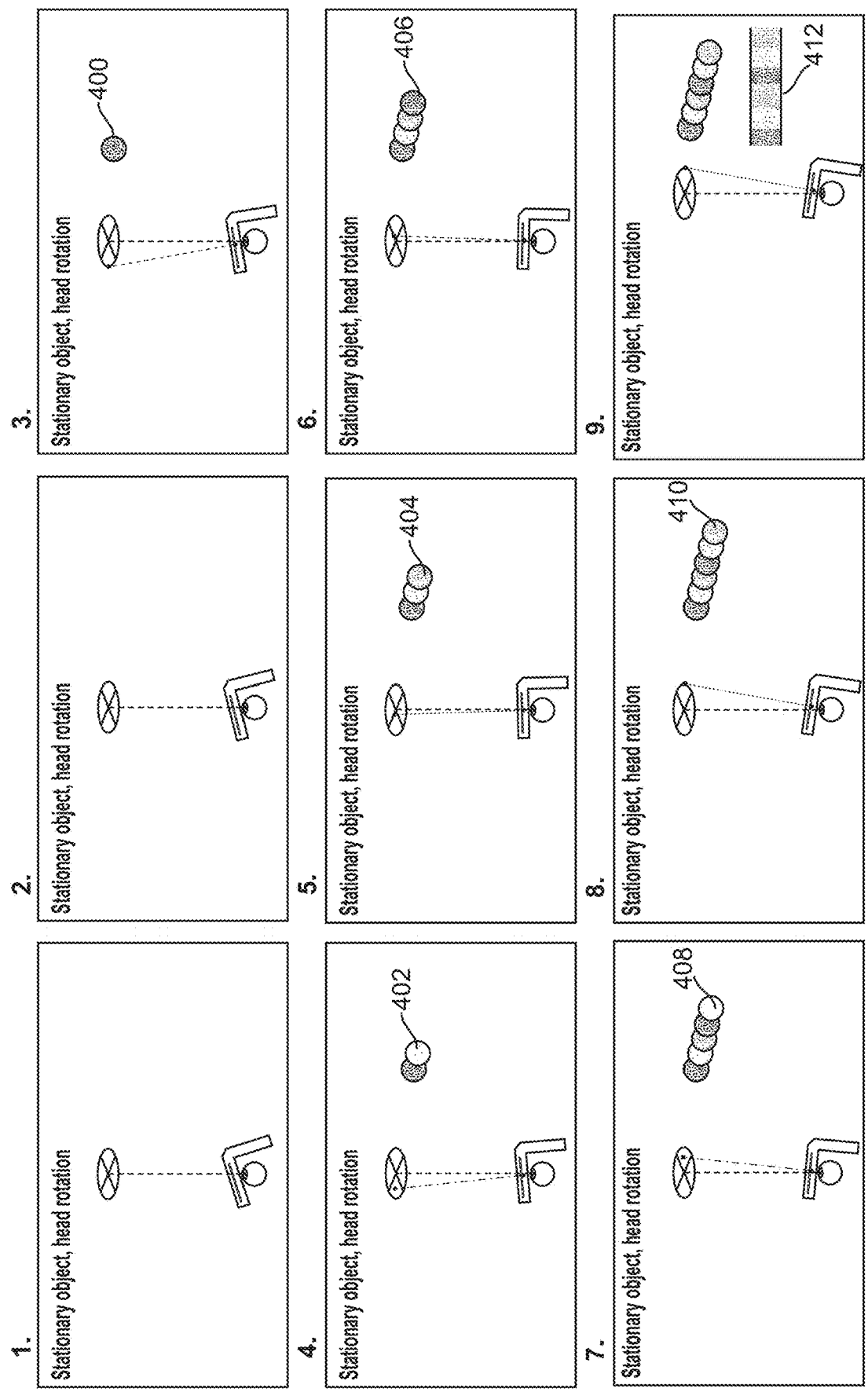
FIG. 4 illustrates a series of drawings associated with a first exemplary VR scenario without any visual correction being applied on the rendered image.

FIG. 4 illustrates a series of drawings (drawings 1-9) illustrating the clockwise head movement with respect to the virtual object, along with the color fields displayed on the display device at an exemplary rate of 60 fps. No visual correction (e.g. head pose based warp or eye tracking based correction) is applied in the drawings shown in FIG. 4.

As the headset 200 as well as the display device 202 moves clockwise with respect to the user's pupils, the user's line of sight 208 remains fixed on the virtual object 206. At the third drawing, the first color field 400 is formed on a predetermined location (e.g. pixel) on the display device 202. When the user continues to move their head without shifting their gaze, the second (e.g. green) color field 402, the third (e.g. blue) color field 404, the fourth (e.g. red) color field 406, the fifth (e.g. green) color field 408 and the sixth (e.g. blue) color field 410 are displayed on the display device as shown in drawings 4-8, respectively. As shown in these drawings, the color fields 402 through 410 form outside the line of sight of the user. Rather, the color fields 402 through 410 are formed on a normal to the display device 202 as opposed to the line of sight of the user 208. As a result, the color fields 402 through 410 are mapped to the same place on the display device, and the image displayed on the display device 202 exhibits color breakup. The final drawing (i.e. drawing 9) illustrates the final rendering of the color fields 412 on the display device as perceived by the user. As shown there is too much blur and color breakup on the displayed color fields 412 illustrated in drawing 9.

A conventional fix to the problem may warp the image frame based on the estimated head pose of the user. The MR system can detect and/or predict (e.g., using inertial measurement units) the head pose. The MR system can then warp or transform the rendered virtual content from the source frame of reference into warped virtual content in the output frame of reference.

Figure 5:
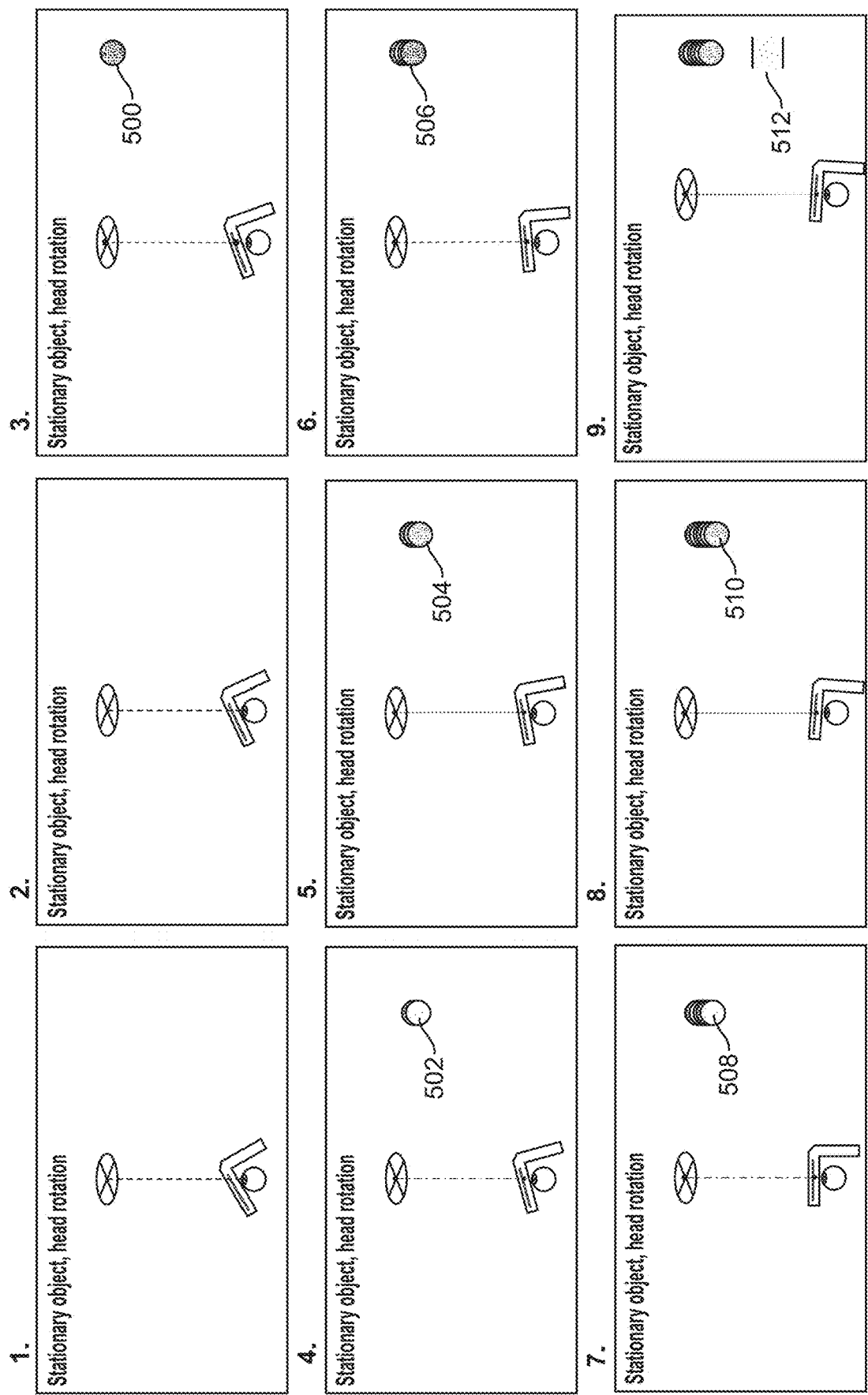
FIG. 5 illustrates a series of drawings associated with the first exemplary VR scenario with conventional head pose based correction being applied to the rendered image.

The head pose based solution to the first scenario is illustrated in FIG. 5. The MR system may know the head pose at the first drawing, and then extrapolate the head pose to estimate where the head will be at different points in time (as illustrated in subsequent drawings 2-8). The different points in time may correspond to points in time where a color field 500, 502, 504, 506, 508, 510 will be displayed on the display device, as illustrated in drawings 3-8, respectively. Once the head pose is extrapolated, the system may then shift one or more color fields (e.g., red, green, blue) so that they color fields 500 through 510 line up on the display device. The head pose based warp is able to place the color fields 500 through 510 on the line of sight of the user (e.g. all color fields appear on the line of sight 208 of the user illustrated with the normal line to the pupil), thereby eliminates the color breakup. However, the drawing 9 of FIG. 5 illustrates that while the head pose based warp provides an image 512 of the virtual object without the color breakup, the virtual object may still appear blurry on the display device due to the rate at which the display is updated. In the exemplary scenarios discussed herein, the display is assumed to be updating at 360 Hz. Thus, the image can be changed every 2.8 ms, which would result in the image having 2.8 ms worth of blur, even though the colors do line up. If the display is configured to update much faster, such as at 100,000 Hz (e.g. in case of a micro-LED display, a digital light processing (DLP) display, or a ferroelectric liquid crystal display), the resulting image would only have 0.01 ms worth of blur which would be imperceptible.

Figure 6:
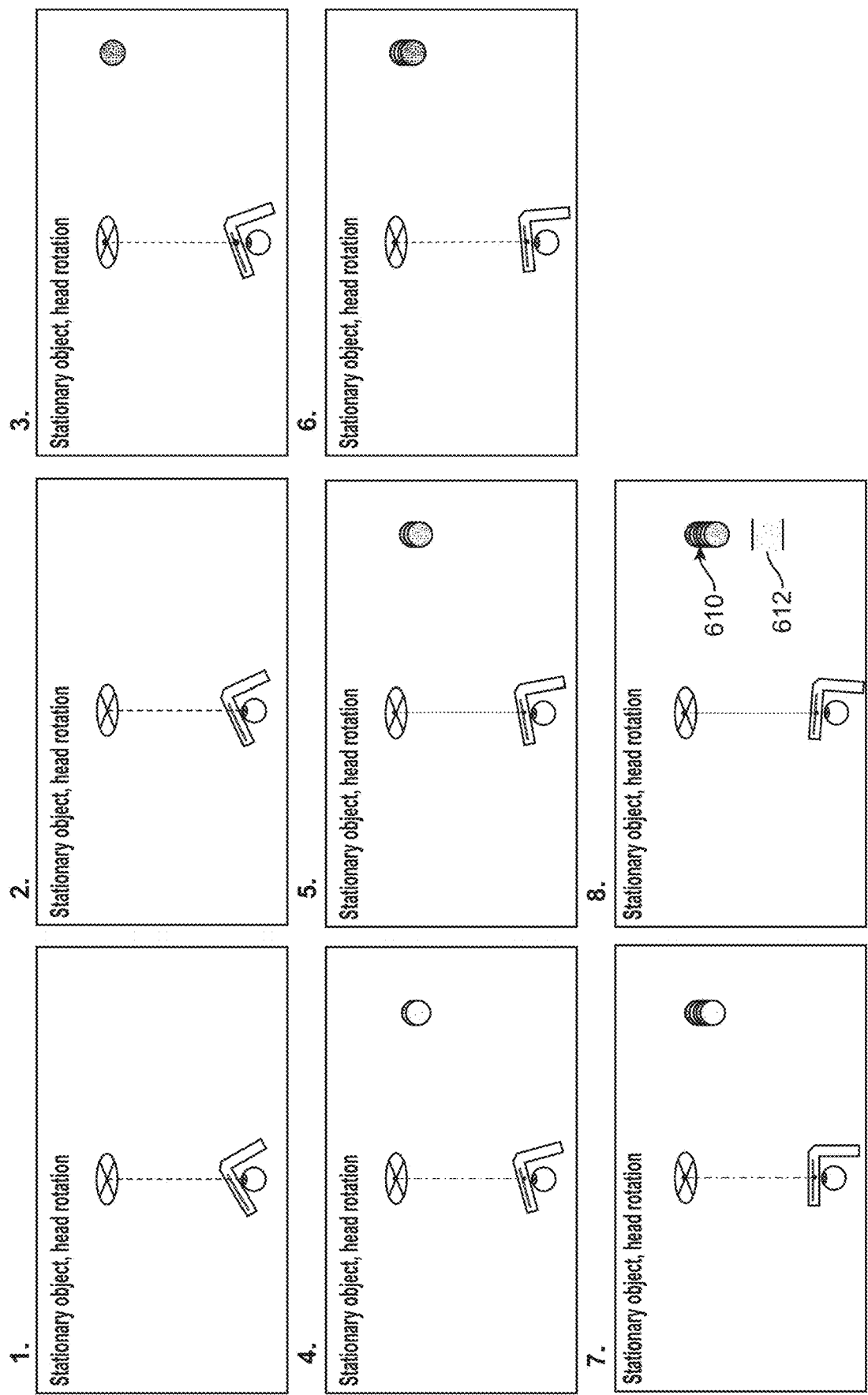
FIG. 6 illustrates a series of drawings associated with the first exemplary VR scenario with eye tracking based shifting being applied to the rendered image, according to some embodiments.

FIG. 6 illustrates a series of drawings (e.g. drawings 1-8) the eye tracking based solution to the first scenario according to various embodiments. The position of the pupils of the user may be tracked using a high-sample-rate, robust, high-accuracy eye tracking device coupled to the MR system. The eye tracking device may determine the position of the user's pupils at different points in time where a color field will be displayed on the display device. Accordingly, the eye tracking based solution "locks" or "sticks" the color fields to user's pupils or retinae instead of making them stick to the real world (as is done in conventional warping techniques and/or systems). The system may then calculate an eye velocity (e.g. velocity of the user's pupils with respect to the headset or display device worn by the user) in x and y pixels to shift the color fields relative to the rendered frame. For example, if the user's gaze is moving at 10 pixels per millisecond, and the time offset between the color fields is 3 milliseconds, then the rendered color fields will be shifted by 30 pixels each. As a result, instead of the color fields lining up in the same place on the display, one or more of the color fields are shifted on the display causing them to line up in the same place on the user's retinae.

For example, without any correction, all six color fields may be mapped to some exemplary pixel coordinates (e.g. 10,20) on the display device. Based on the eye tracking, the system may consider two subsequent positions of the user's eye. For example, the user's eye may be moving to the left at 10 pixels per time unit, where one time unit is the difference in when different color fields are displayed on the display device. If the color fields are to be mapped to the pixel coordinates (10,20), the centroid of the six color fields should be mapped to (10,20). Thus, each color field may have to be displaced by a shift value so the first color field may be mapped to (35,20), the second color field may be mapped to (25,20), the third color field may be mapped to (15,20), the fourth color field may be mapped to (5,20), the fifth color field may be mapped to (−5,20) and the sixth color field may be mapped to (−15,20). Accordingly, each color field will be shifted (e.g. displaced) at exactly the right spacing to correspond to the eye velocity. The centroid of the color fields is at (10,20), while each of the color fields are shifted by a shift value determined based on the eye velocity (or the position of the user's pupils at different points in time). For example, the red color field shifted to the right of the (10,20) coordinates and ends up falling right in line with where the user is looking. The next color fields (e.g. green color field, the blue color field, and the repeating pattern) are shifted on the display instead of being in the same place as the red color field, causing the color fields to line up on the same place on the user's retina.

As illustrated in the series of drawings of FIG. 6, the color fields 610 all appear on the line of sight of the user, illustrating the color fields 610 line up on the same place on the user's retina. Therefore, the color breakup is eliminated. The shifting of the color fields on the rendered image frame 612 works well with the spatial light modulating displays because the entire rendered frame is not displayed at once, rather it is displayed at six different times. Embodiments shift the color fields 610 by a shift value (measured in pixels) which is calculated as the product of the eye velocity (measured in pixels per millisecond) and the time (measured in milliseconds) each color field will be displayed on the display device.

According to various embodiments, the eye velocity may be calculated as a function of the first position of the user's pupils, the second position of the user's pupils and a time elapsed for the pupils of the user to get from the first position to the second position. The eye velocity is calculated with respect to the headset. It may be desirable to calculate the eye velocity as late as possible for increased accuracy. For example, the eye velocity may be calculated right before the first color field is shifted by the shift value, leaving just enough time for the system to calculate the shift value using the eye velocity.

In some embodiments, the same eye velocity may be used to calculate the shift value for all six color fields. Yet in other embodiments, a first eye velocity may be calculated for a first color field, and a second eye velocity may be calculated for a second color field. In some embodiments, different eye velocities may be calculated to determine a different shift value for each one of the six color fields. For MR devices that render at 60 Hz, the eye tracking based shifting may be performed at 360 Hz.

In some embodiments, the eye velocity may be zero. For example, the user may not change their gaze, and merely change their focus (e.g. looking from a faraway object to a closer object, where both objects are on the same line of sight). In such embodiments, the rendered image may still be warped or shifted however since the eye velocity would be zero, the shift value will be calculated as zero (e.g. no shift applied to the rendered image or the color fields).

Exemplary Scenario Two

In the second exemplary VR scenario, a virtual object (e.g. a virtual gnome) appears on a real world object (e.g. a desk) in front of the user. The user tries to look around the gnome by swaying their body side to side so that the user can see what is behind the gnome. In such a scenario, the user's head undergoes translation without a rotation. While the user's body and head moves side to side, the user's gaze remains on the gnome.

Figure 7:
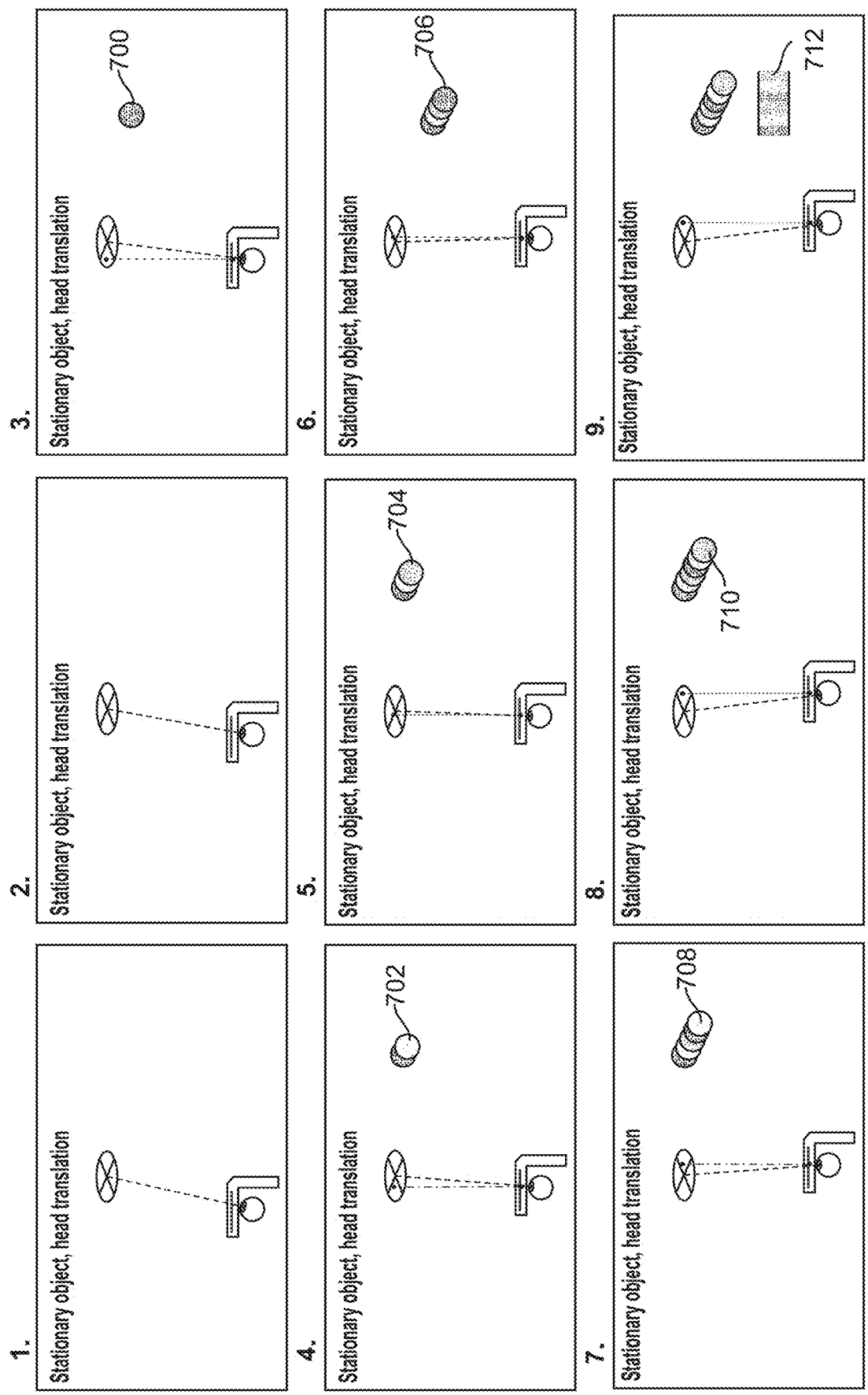
FIG. 7 illustrates a series of drawings associated with a second exemplary VR scenario without any visual correction being applied on the rendered image.

FIG. 7 illustrates a series of drawings (e.g. drawings 1-9) illustrating the head movement, along with the color fields 700, 702, 704, 706, 708, 710 rendered on the display device using a head pose based warp to shift the rendered image, where only the orientation of the head and not the translation is used (e.g. the head is moving but not rotating). As the headset 200 as well as the display device 202 moves left-to-right with respect to the virtual object 206, the user's line of sight 208 remains fixed on the virtual object 206. At the third drawing, the first color field 700 is formed on a predetermined location (e.g. pixel) on the display device 202. When the user continues to move their head without shifting their gaze, the second (e.g. green) color field 702, the third (e.g. blue) color field 704, the fourth (e.g. red) color field 706, the fifth (e.g. green) color field 708 and the sixth (e.g. blue) color field 710 are displayed on the display device as shown in drawings 4-8, respectively.

The MR system may know the head pose at the first drawing, and then extrapolate the head pose to estimate where the head will be at different points in time (as illustrated in drawings 2-8). The different points in time may correspond to points in time where a color field 700 through 710 will be displayed on the display device, as illustrated in drawings 3-8. Once the head pose is extrapolated, the system may then shift one or more color fields (e.g., red, green, blue) so that they color fields line up on the display device. As shown in these drawings, the color fields form outside the line of sight of the user. Rather, the color fields are formed on a normal to the display device 202 as opposed to the line of sight of the user 208. As a result, the color fields are mapped to the same place on the display device, and the image 712 displayed on the display device 202 exhibits color breakup. The drawing 9 illustrates the final rendering of the color fields on the display device as perceived by the user. As shown, there is too much blur and color breakup on the displayed image 712. If the system tries to correct the artefacts using head pose based warp which tracks orientation and not translation, the correction will not be enough. The system would need the head pose in 6 degrees of freedom (which tracks both orientation and translation), as well as the object depth plane (or the vergence depth).

Figure 8:
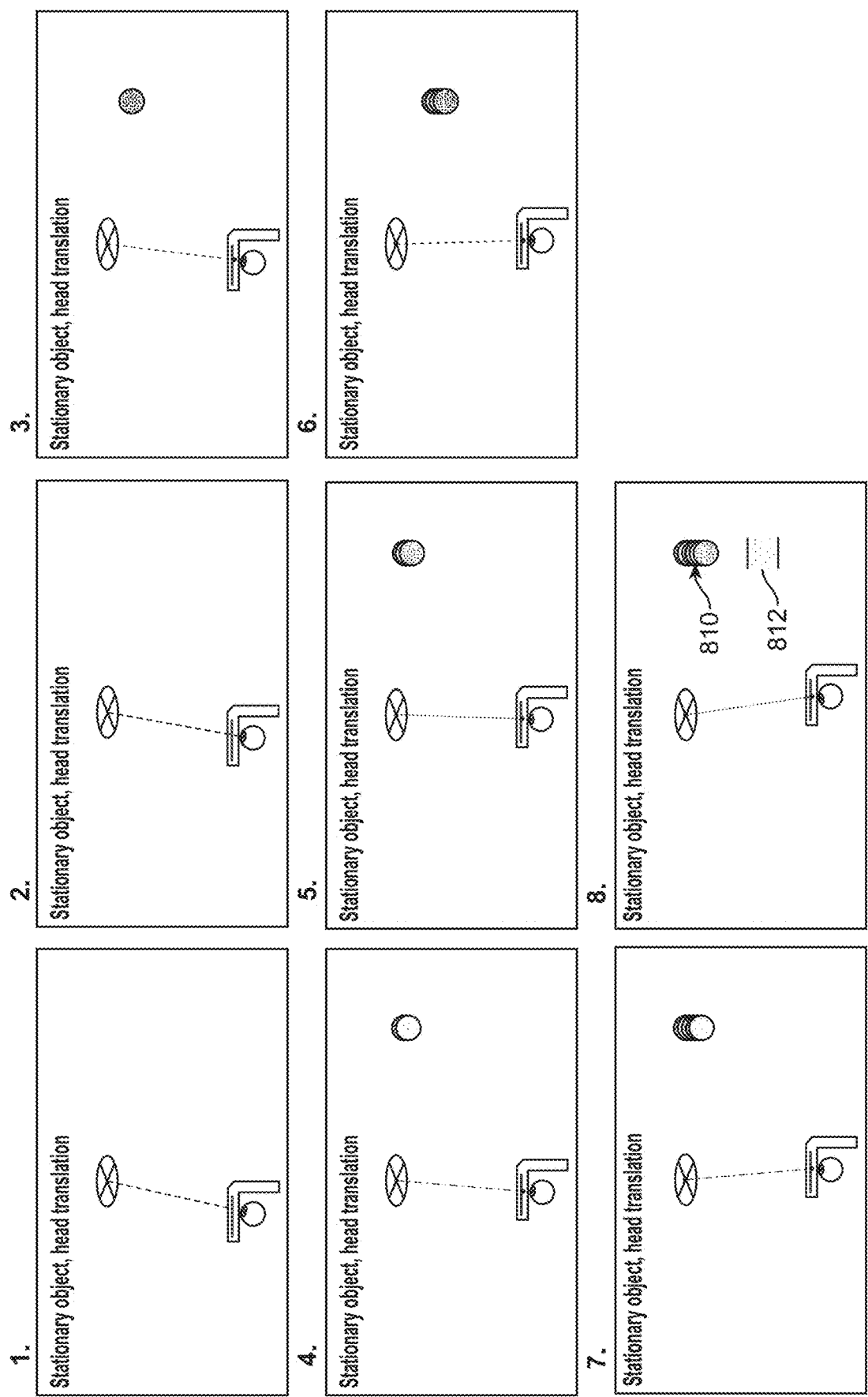
FIG. 8 illustrates a series of drawings associated with the second exemplary VR scenario with eye tracking based shifting being applied to the rendered image, according to some embodiments.

FIG. 8 illustrates a series of drawings (e.g. drawings 1-8) illustrating the eye tracking based solution to the second scenario according to various embodiments. The position of the pupils of the user may be tracked using a high-sample-rate, robust, high-accuracy eye tracking device coupled to the MR system. The eye tracking device may determine the position of the user's pupils at different points in time where a color field will be displayed on the display device. Accordingly, the eye tracking based solution "locks" or "sticks" the color fields to user's pupils or retinae instead of making them stick to the real world (as is done in conventional warping techniques and/or systems). The system may then calculate an eye velocity (e.g. velocity of the user's pupils with respect to the headset or display device worn by the user) in x and y pixels to shift the color fields relative to the rendered frame. As a result, instead of the color fields lining up in the same place on the display, one or more of the color fields are shifted on the display causing them to line up in the same place on the user's retinae.

As illustrated in the series of drawings of FIG. 8, the color fields 810 all appear on the line of sight of the user, illustrating the color fields 810 line up on the same place on the user's retina. Therefore the color breakup and blur are eliminated on the rendered image 812 as shown in drawing 8 of FIG. 8.

Exemplary Scenario Three

In the third exemplary VR scenario, a virtual object (e.g. a virtual mouse) appears behind a real world object (e.g. a coffee cup) in front of the user. For example, the mouse pokes his head out from behind the coffee cup. The mouse runs over from the coffee cup to another object in the scene. The user follows the mouse with their gaze without moving. In such a scenario, the virtual object moves, but the user's head is stationary. The user's gaze remains on the moving virtual object.

Figure 9:
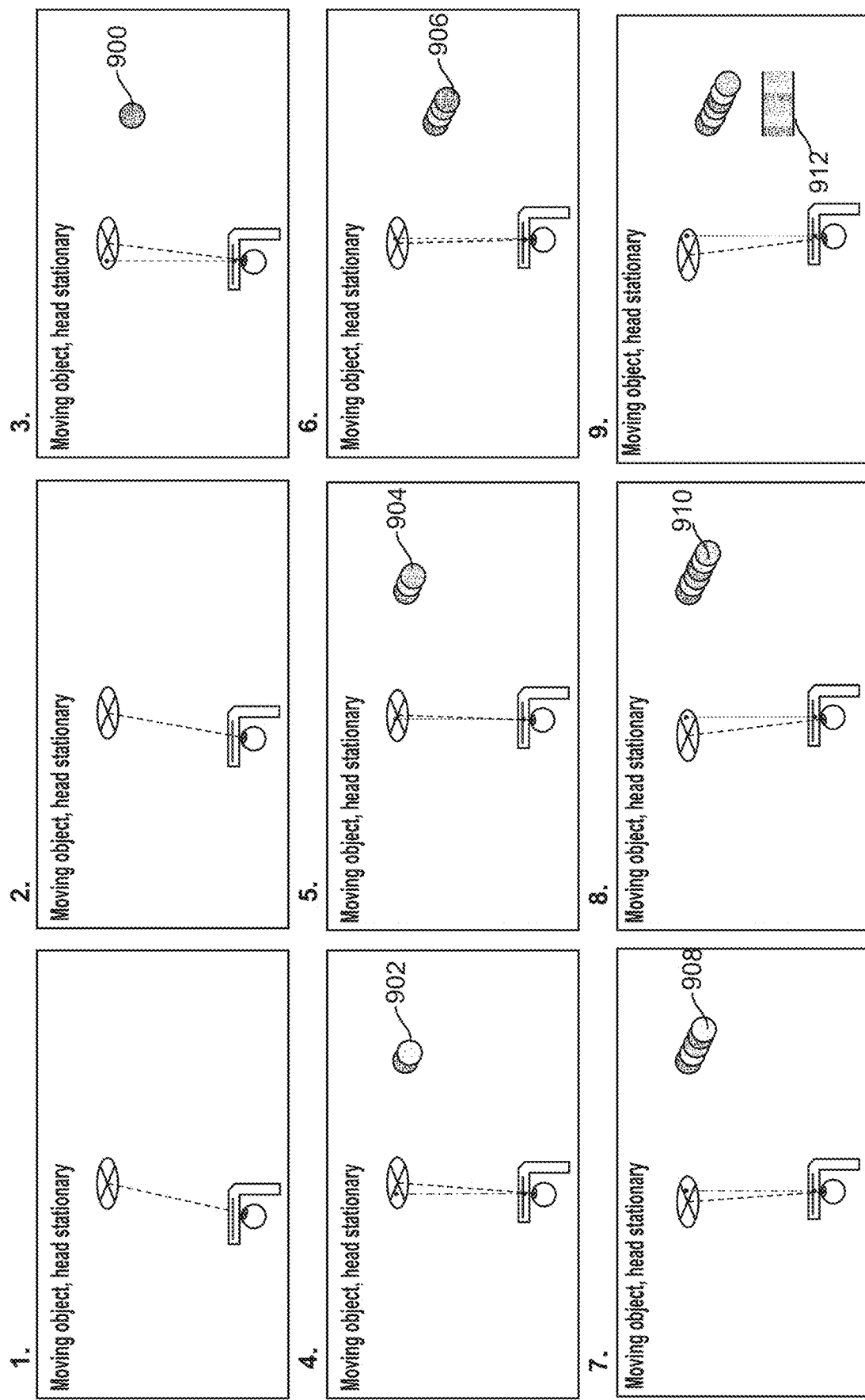
FIG. 9 illustrates a series of drawings associated with a third exemplary VR scenario without any visual correction being applied on the rendered image.

FIG. 9 illustrates a series of drawings (e.g. drawings 1-9) illustrating the movement of the virtual object, along with the color fields rendered on the display device. As the virtual object 206 moves right-to-left with respect to the headset 200 as well as the display device 202, the user's line of sight 208 remains fixed on the virtual object 206. At the third drawing, the first color field 900 is formed on a predetermined location (e.g. pixel) on the display device 202. When the virtual object continues to move with respect to the headset without the user shifting their gaze from the virtual object, the second (e.g. green) color field 902, the third (e.g. blue) color field 904, the fourth (e.g. red) color field 906, the fifth (e.g. green) color field 908 and the sixth (e.g. blue) color field 910 are displayed on the display device as shown in drawings 4-8, respectively. Since the user's head is not moving, conventional head pose based warping will not be able to correct the blur and the color breakup on the displayed image 912 as shown in drawing 9 of FIG. 9. That is, since the head pose is the same, the head pose based warp applied will result in a shift of zero pixels for each color field. The conventional approach to correcting for this is to use motion vectors for the virtual objects in addition to head pose to perform the warp.

Figure 10:
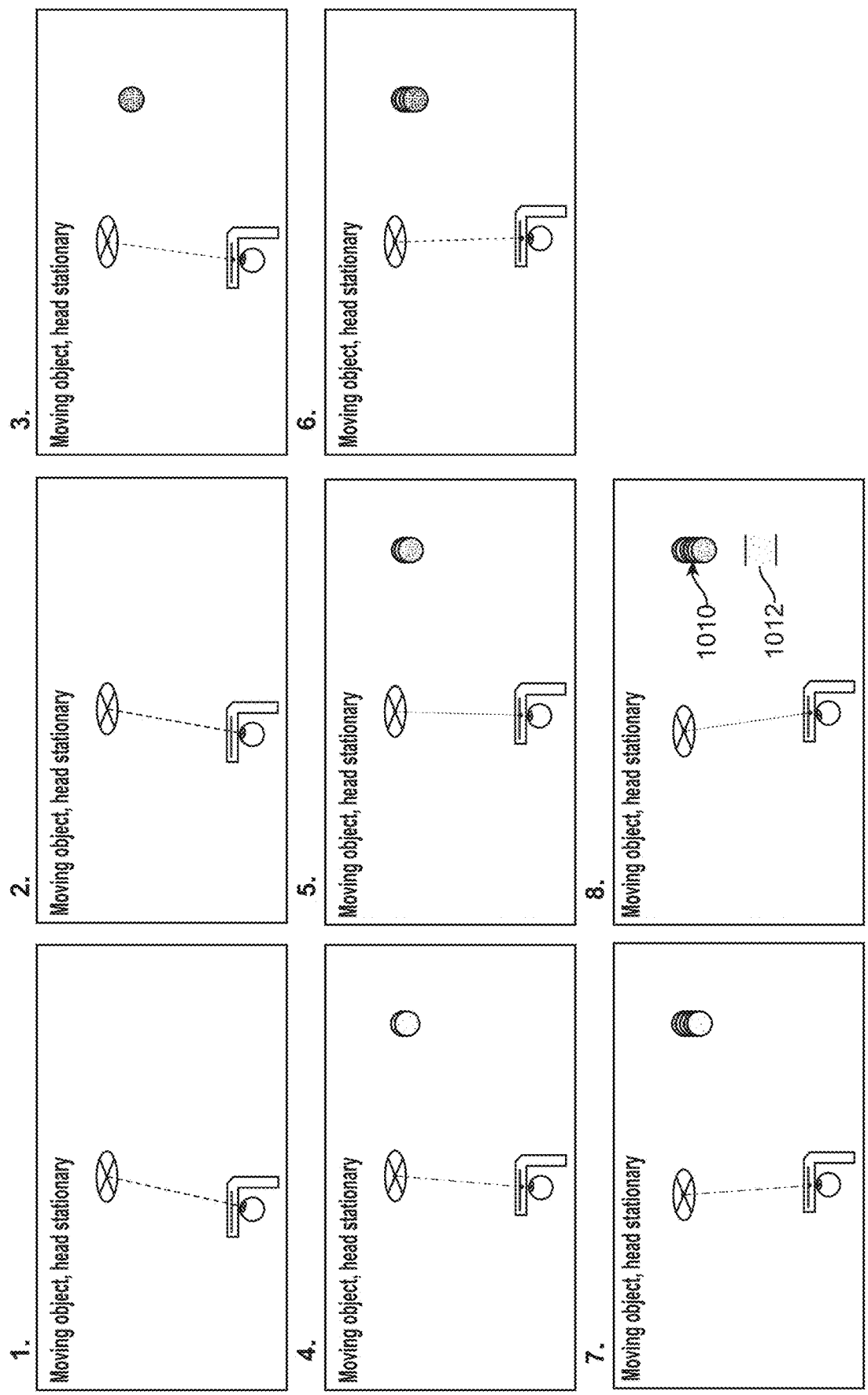
FIG. 10 illustrates a series of drawings associated with the third exemplary VR scenario with eye tracking based shifting being applied to the rendered image, according to some embodiments.

FIG. 10 illustrates a series of drawings illustrating the eye tracking based solution to the third scenario according to various embodiments. The position of the pupils of the user may be tracked using a high-sample-rate, robust, high-accuracy eye tracking device coupled to the MR system. The eye tracking device may determine the position of the user's pupils at different points in time where a color field will be displayed on the display device. Accordingly, the eye tracking based solution "locks" or "sticks" the color fields to user's pupils or retinae instead of making them stick to the real world (as is done in conventional warping techniques and/or systems). The system may then calculate an eye velocity (e.g. velocity of the user's pupils with respect to the headset or display device worn by the user) in x and y pixels to shift the color fields relative to the rendered frame. As a result, instead of the color fields lining up in the same place on the display, one or more of the color fields are shifted on the display causing them to line up in the same place on the user's retinae.

As illustrated in the series of drawings of FIG. 10, the color fields 1010 all appear on the line of sight of the user, illustrating the color fields 1010 line up on the same place on the user's retina. Therefore, the color breakup and blur are eliminated on the rendered image 1012 as shown in drawing 8 of FIG. 10.

Exemplary Scenario Four

The third scenario exemplifies how rendering and image display gets complicated when the virtual object is in motion. The head pose based warping is not enough to correct the blur and color breakup on the displayed image. The next scenario illustrates that in certain cases, the head pose based warping not only is not enough to correct the artefacts, but also makes the quality of the displayed image worse.

In the fourth exemplary VR scenario, a virtual object (e.g. a virtual fish) moves around the user. The user turns their whole body to follow the virtual object. Both the headset and the user's pupils are rotating relative to the real world, but are fixed relative to each other.

Figure 11:
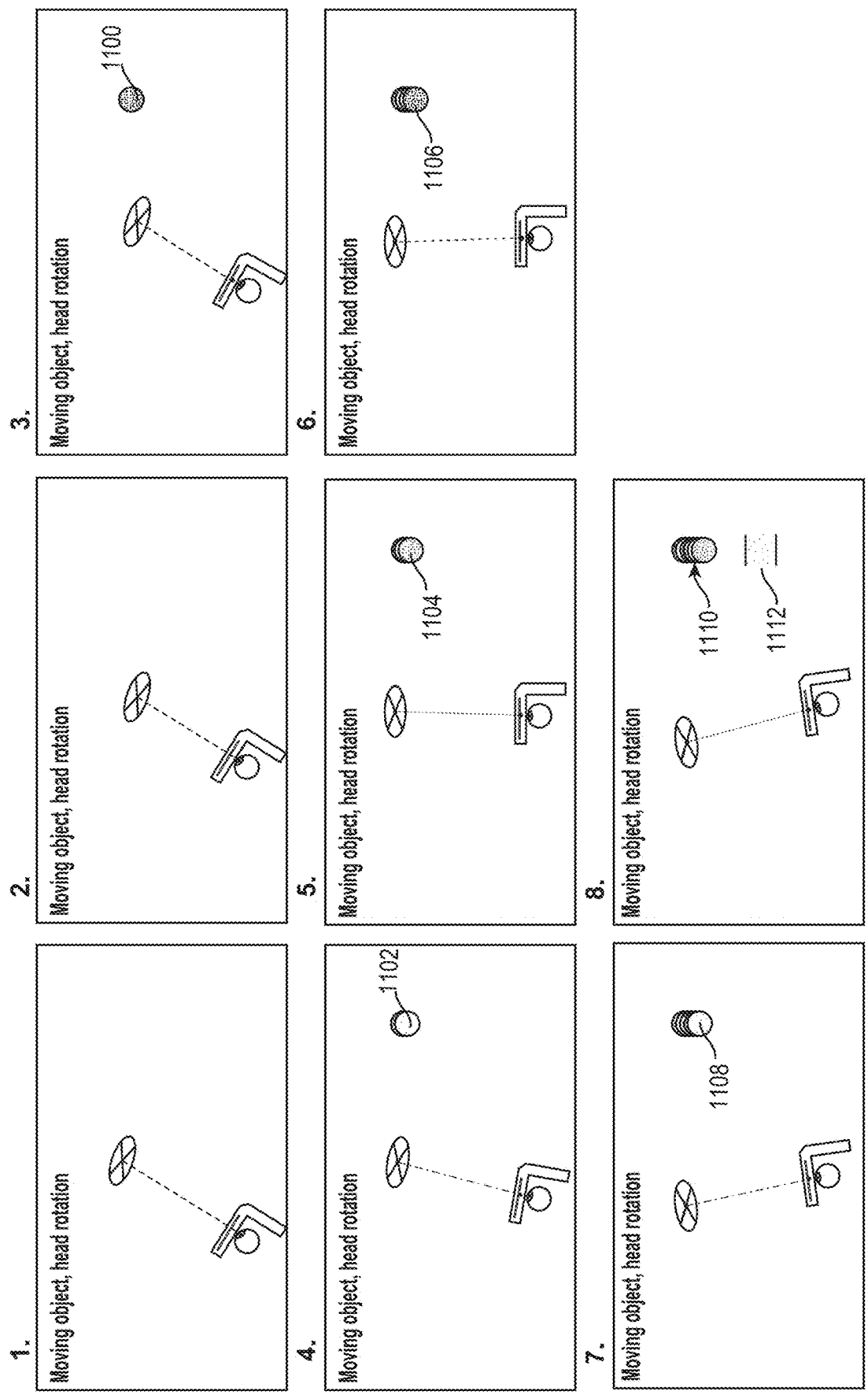
FIG. 11 illustrates a series of drawings associated with a fourth exemplary VR scenario without any visual correction being applied on the rendered image.

FIG. 11 illustrates a series of drawings (drawings 1-8) illustrating the headset and pupil movement while remaining fixed relative to each other, along with the color fields rendered on the display device. Head pose warp is not applied in the drawings illustrated in FIG. 11. As the headset 200 (including the display device 202) as well as the user's gaze move counter-clockwise along with the virtual object 206, the user's line of sight 208, as well as the normal vector to the display device 202 remain fixed on the virtual object 206. At the third drawing, the first color field 1100 is formed on a predetermined location (e.g. pixel) on the display device 202. When the user continues to move their head without shifting their gaze, the second (e.g. green) color field 1102, the third (e.g. blue) color field 1104, the fourth (e.g. red) color field 1106, the fifth (e.g. green) color field 1108 and the sixth (e.g. blue) color field 1110 are displayed on the display device as shown in drawings 4-8, respectively. Since the user is following the moving object with their eyes and their head, the resulting image 1112 is sharp, without any blur or color breakup.

Figure 12:
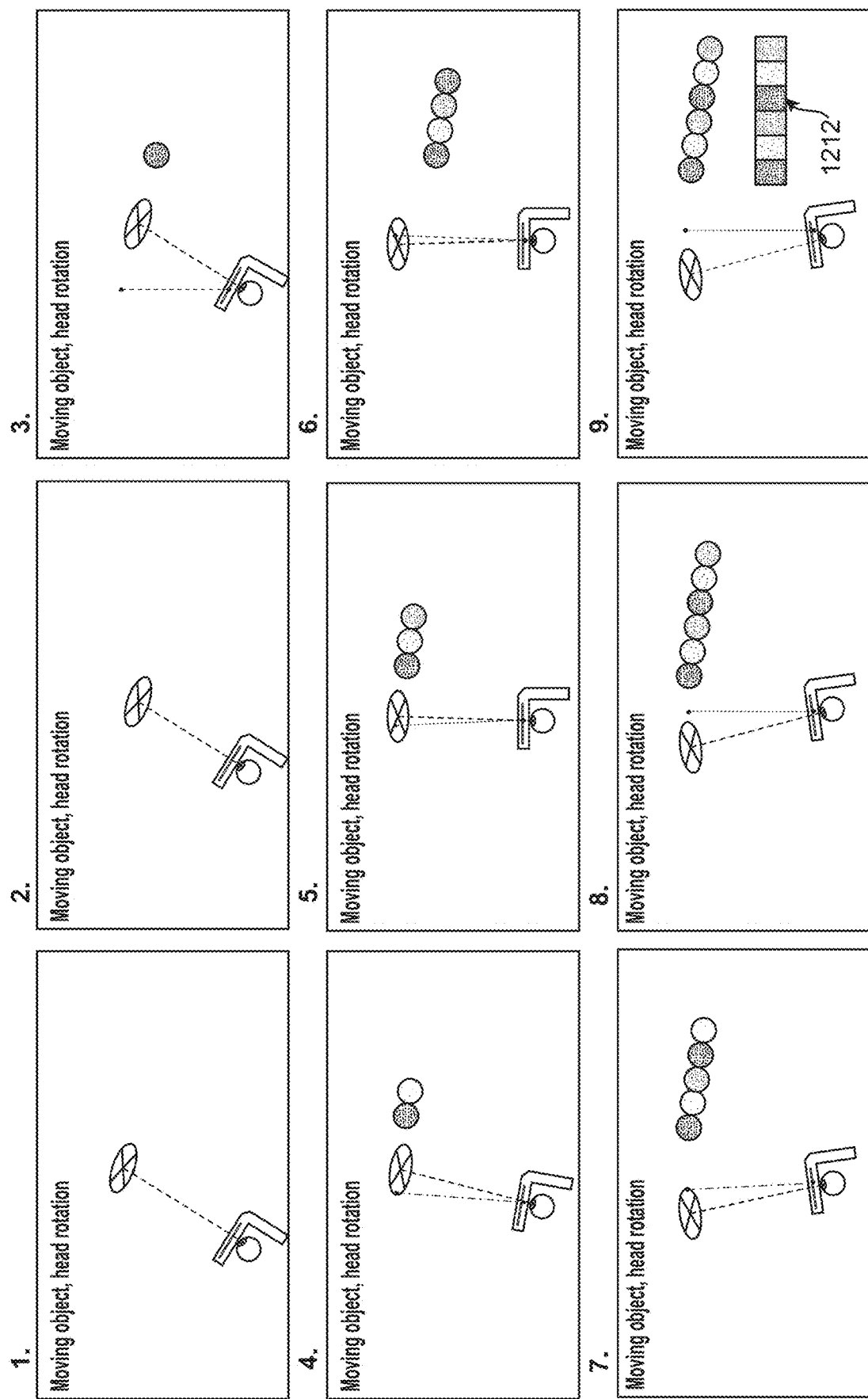
FIG. 12 illustrates a series of drawings associated with the fourth exemplary VR scenario with conventional head pose based correction being applied to the rendered image.

On the other hand, for an MR system which is applying a head pose based warp for each rendered image frame, the exemplary scenario four results in a low quality image. That is, the head pose based warp lowers the quality of the displayed image by inserting blur and/or color breakup, as illustrated in FIG. 12.

The MR system may know the head pose at the first drawing, and then extrapolate the head pose to estimate where the head will be at different points in time (as illustrated in subsequent drawings). The different points in time may correspond to points in time where a color field will be displayed on the display device, as illustrated in drawings 3-8. Once the head pose is extrapolated, the system may then shift one or more color fields (e.g., red, green, blue) so that they color fields line up on the display device. The head pose based warp aims to place the color fields on the line of sight of the user, however does not account for the movement of the virtual object. Thus, the head pose based warp tries to lock the virtual object to the world and introduces blur and color breakup to the rendered image 1212, as illustrated in the last drawing of FIG. 12. In fact, the color breakup introduced by the head pose based warp is worse than the previously illustrated artefacts because the colors do not even blend together.

Figure 13:
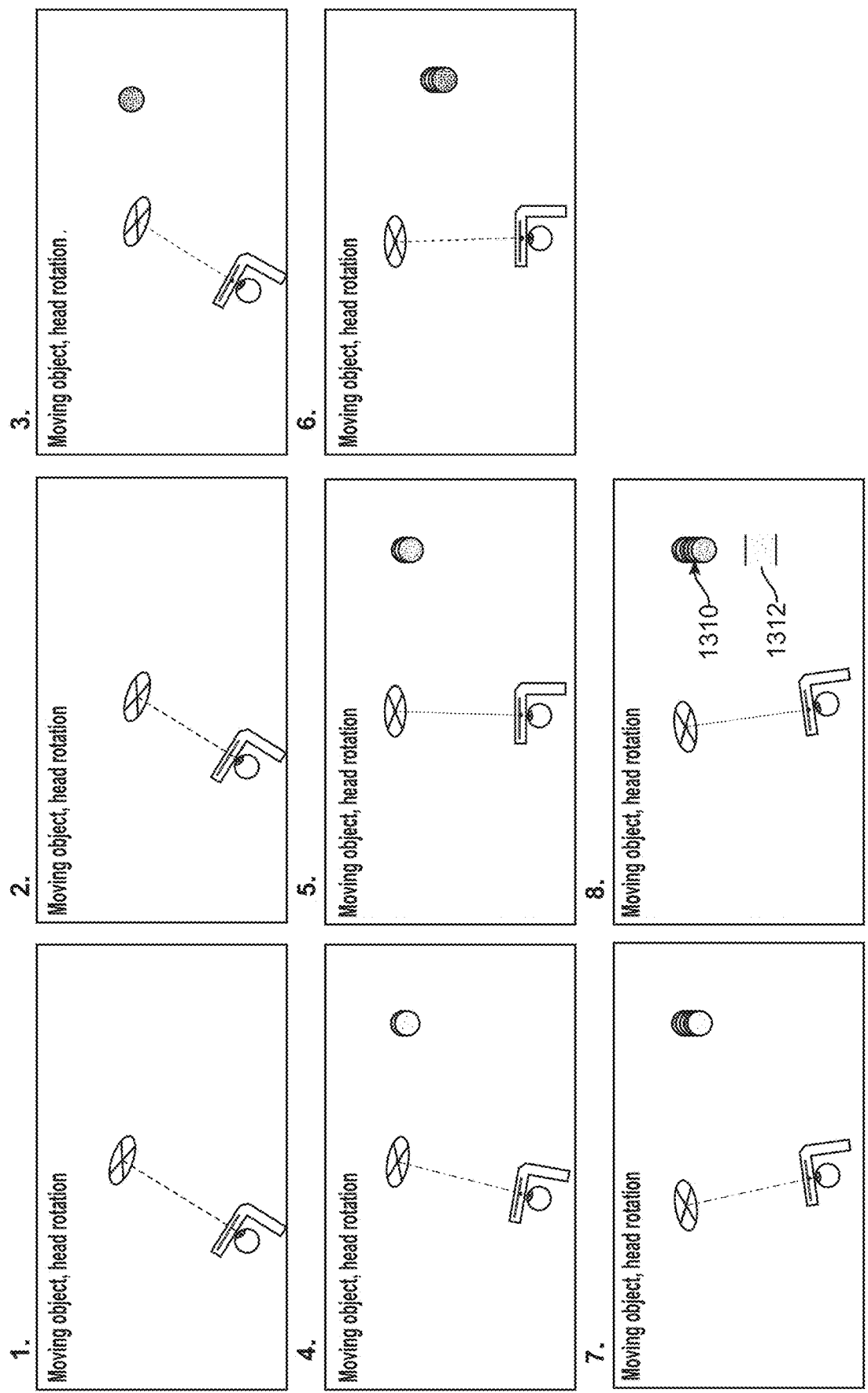
FIG. 13 illustrates a series of drawings associated with the fourth exemplary VR scenario with eye tracking based shifting being applied to the rendered image, according to some embodiments.

FIG. 13 illustrates the eye tracking based solution to the fourth scenario according to various embodiments. Since the system calculates the eye velocity with respect to the headset, when the headset and the pupils are moving at the same time, the eye velocity is zero. Thus, the eye-velocity based shift value is zero. As illustrated in the drawings of FIG. 13, the color fields 1310 all appear on the line of sight of the user, illustrating the color fields 1310 line up on the same place on the user's retina. Therefore, the color breakup and blur are both eliminated on the displayed image 1312. Thus, the result is the same as in FIG. 11, even when the eye tracking based solution is applied by default.

Exemplary Scenario Five

In the fifth exemplary VR scenario, a virtual object (e.g. a virtual robot) is in the center of the user's field of view. However, the user is not looking at the virtual object. Instead, the user may be comparing two other virtual objects or areas next to the virtual object. For example, the user may be looking at an area 216 placed to the right of the virtual object and the area 226 placed to the left of the virtual object. That is, the user may be darting their eyes back and forth between the two areas, and across the virtual object. This eye movement may be referred as "saccading". This scenario is similar to the third exemplary VR scenario, except for the eyes moving at a faster velocity.

Figure 14:
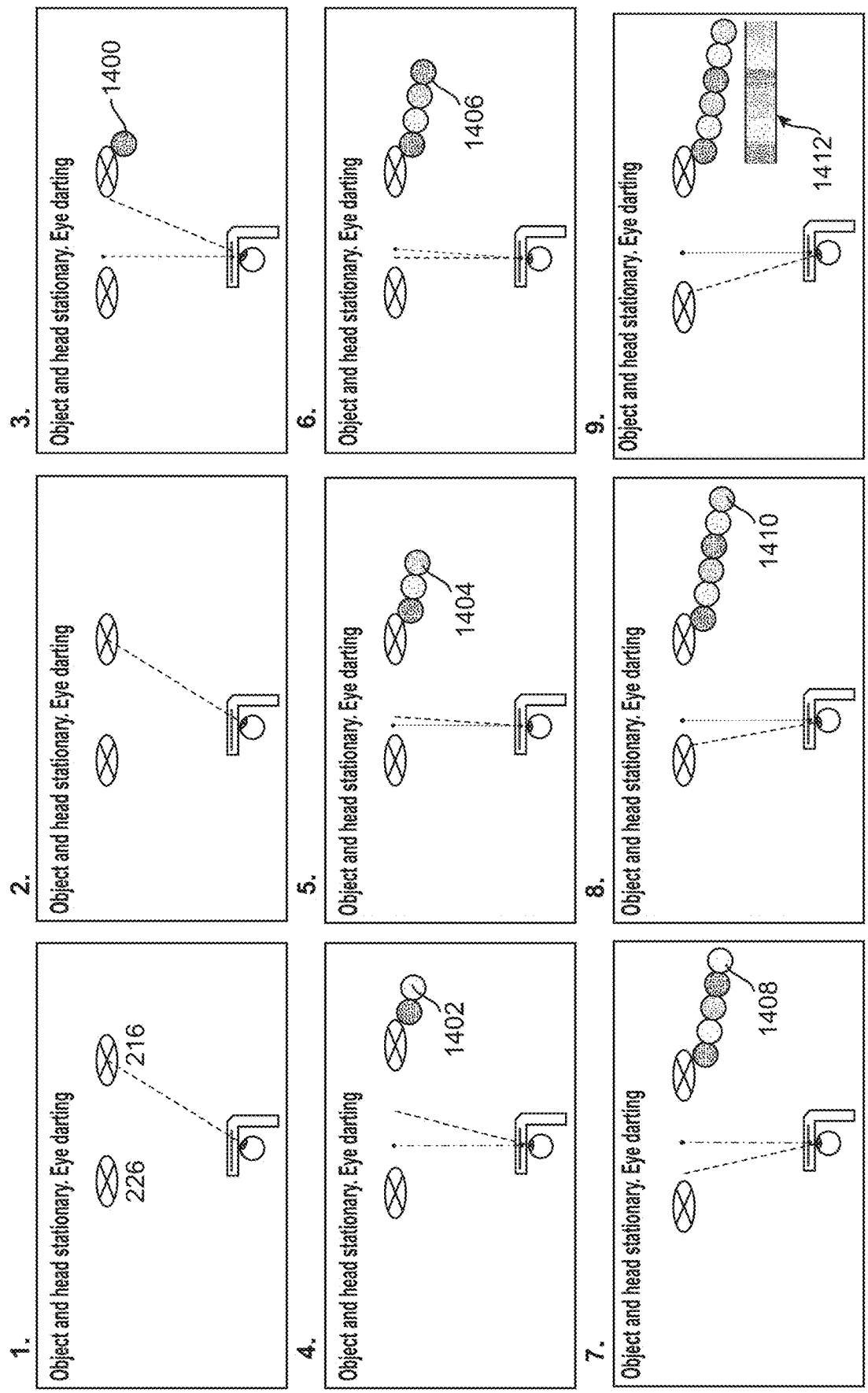
FIG. 14 illustrates a series of drawings associated with a fifth exemplary VR scenario without any visual correction being applied on the rendered image.

FIG. 14 illustrates a series of drawings illustrating the saccading eye movement, along with the color fields rendered on the display device using a head pose based warp to the rendered image. As the headset 200 as well as the display device 202 remains static, the user moves their eyes from moves left-to-right with respect to the areas 216 and 226, the user's line of sight 208 moves between the two areas. At the third drawing, the first color field 1400 is formed on a predetermined location (e.g. pixel) on the display device 202. When the user continues to move their eyes, the second (e.g. green) color field 1402, the third (e.g. blue) color field 1404, the fourth (e.g. red) color field 1406, the fifth (e.g. green) color field 1408 and the sixth (e.g. blue) color field 1410 are displayed on the display device as shown in drawings 4-8, respectively. As shown in the last drawing of FIG. 14, the displayed image 1412 exhibits color breakup. Since the user's head is not moving, conventional head pose based warping will not be able to correct the artefact on the displayed image 1412 (e.g. the head pose is the same, thus the warp applied based on head pose will be zero warp). In addition, the motion vector based warp (which could improve scenario three) may not be applied here since there are no real objects and no virtual objects that the user's eye is following.

Figure 15:
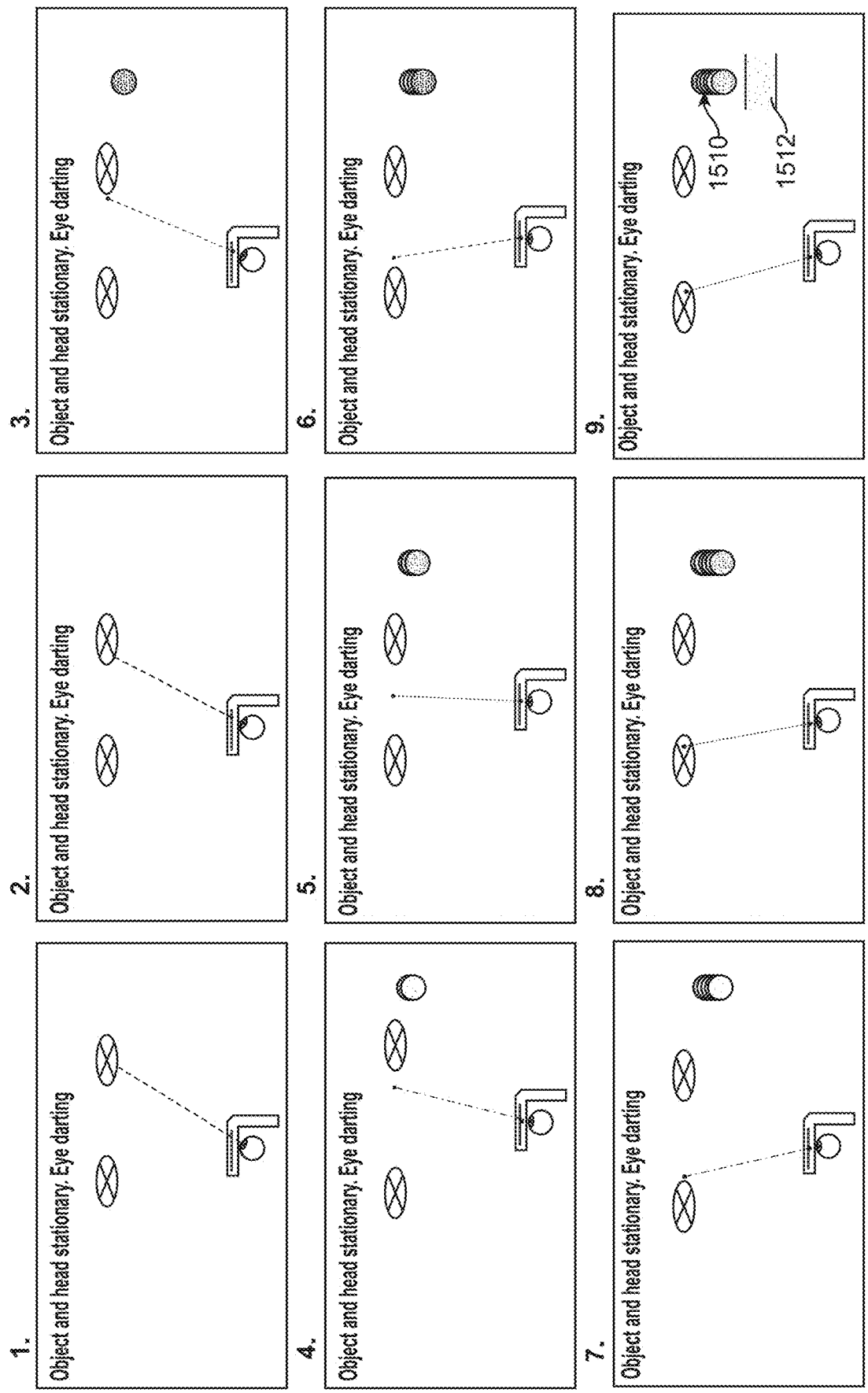
FIG. 15 illustrates a series of drawings associated with the fifth exemplary VR scenario with eye tracking based shifting being applied to the rendered image, according to some embodiments.

FIG. 15 illustrates the eye tracking based solution to the fifth scenario according to various embodiments. The position of the pupils of the user may be tracked using a high-sample-rate, robust, high-accuracy eye tracking device coupled to the MR system. The eye tracking device may determine the position of the user's pupils at different points in time where a color field will be displayed on the display device. Accordingly, the eye tracking based solution "locks" or "sticks" the color fields to user's pupils or retinae instead of making them stick to the real world (as is done in conventional warping techniques and/or systems). The system may then calculate an eye velocity (e.g. velocity of the user's pupils with respect to the headset or display device worn by the user) in x and y pixels to shift the color fields relative to the rendered frame. As a result, instead of the color fields lining up in the same place on the display, one or more of the color fields are shifted on the display causing them to line up in the same place on the user's retinae. As illustrated in the drawings of FIG. 15, the color fields 1510 all appear on the line of sight of the user, illustrating the color fields 1510 line up on the same place on the user's retina. Therefore, the color breakup is eliminated on the displayed image 1512.

The displayed image 1512 shown in the drawing 9 of FIG. 15 may include blur that may be attributable to display persistence during a color field. As the user darts their eyes around, instead of seeing different colors, the user sees some strobing. In some embodiments, artificial blur may be added to the rendered image in addition to the color field shift to correct for the strobing artefact.

In some embodiments, the eye tracking based shifting may be applicable to the two independent-monocles displays. Each eye's tracking may be used to warp the corresponding display. In some embodiments, eye tracking for one eye may be used for both eyes (e.g. when the device loses tracking in one eye).

According to various embodiments, the image frame may be rendered using head pose predicted to centroid of the 6 color fields. A single late-frame time warp may be performed to fix the rendering. Subsequently, an eye tracking based shift may be applied to the warped rendered image to shift one or more of the six color fields by a shift value (it may be the same shift value for all color fields, or a different shift value for one or more of the six color fields). The color field shift based on the eye tracking may be applied on the headset portion of the MR device.

System Architecture Overview

Figure 16:
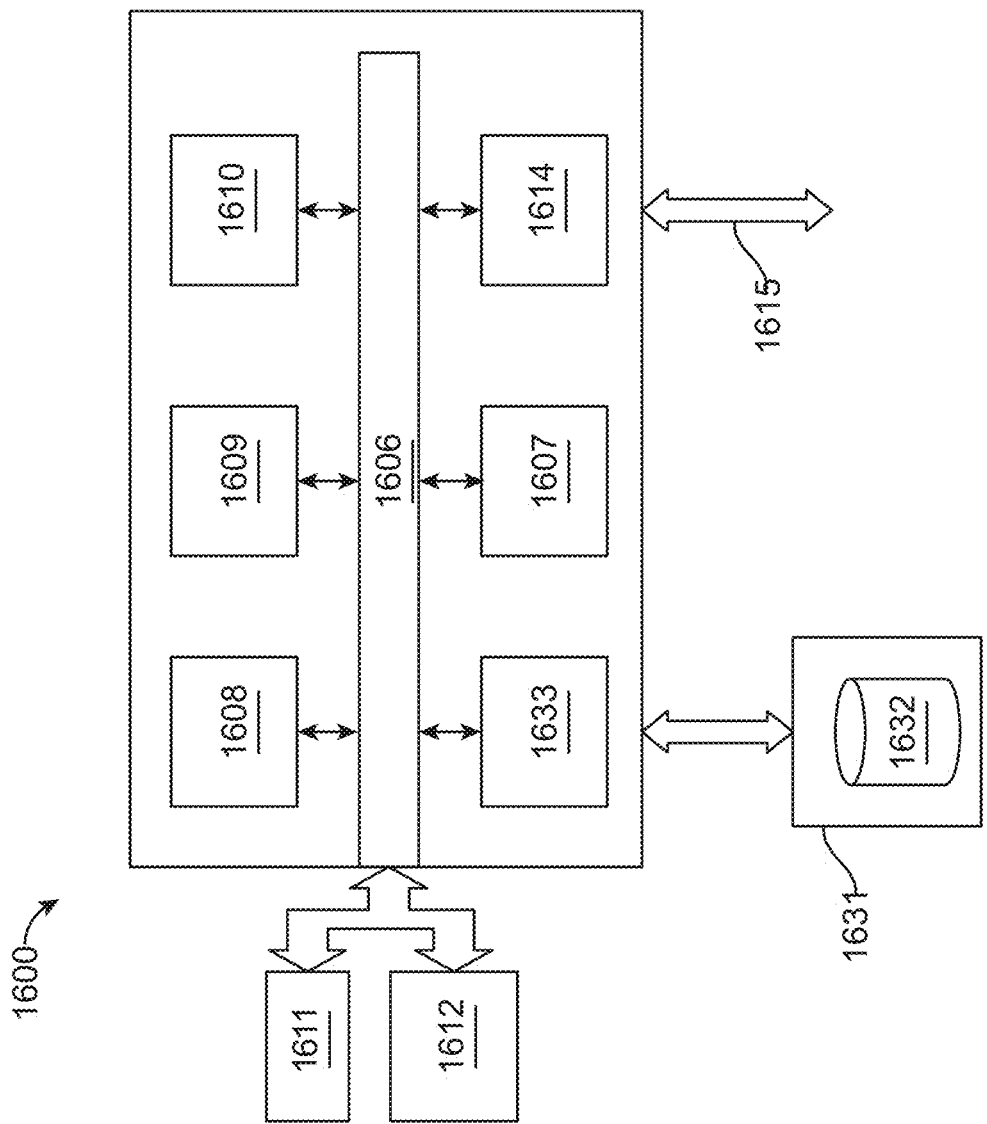
FIG. 16 is a block diagram schematically depicting an illustrative computing system, according to some embodiments.

FIG. 16 is a block diagram of an illustrative computing system 1600 (e.g. an MR device), according to some embodiments. Computer system 1600 includes a bus 1606 or other communication mechanism for communicating information, which interconnects subsystems and devices, such as processor 1607, system memory 1608 (e.g., RAM), static storage device 1609 (e.g., ROM), disk drive 1610 (e.g., magnetic or optical), communication interface 1614 (e.g., modem or Ethernet card), display 1611 (e.g., CRT or LCD), input device 1612 (e.g., keyboard), and cursor control.

According to some embodiments, computer system 1600 performs specific operations by processor 1607 executing one or more sequences of one or more instructions contained in system memory 1608. Such instructions may be read into system memory 1608 from another computer readable/usable medium, such as static storage device 1609 or disk drive 1610. In alternative embodiments, hard-wired circuitry may be used in place of or in combination with software instructions to implement the disclosure. Thus, embodiments are not limited to any specific combination of hardware circuitry and/or software. The term "logic" shall mean any combination of software or hardware that is used to implement all or part of the disclosure.

The term "non-transitory computer readable medium" or "computer usable medium" as used herein refers to any medium that participates in providing instructions to processor 1607 for execution. Such a medium may take many forms, including but not limited to, non-volatile media and volatile media. Non-volatile media includes, for example, optical or magnetic disks, such as disk drive 1610. Volatile media includes dynamic memory, such as system memory 1608.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In some embodiments, execution of the sequences of instructions to practice the disclosure is performed by a single computer system 1600. According to some embodiments, two or more computer systems 1600 coupled by communication link 1615 (e.g., LAN, PTSN, or wireless network) may perform the sequence of instructions required to practice the disclosure in coordination with one another.

Computer system 1600 may transmit and receive messages, data, and instructions, including program, i.e., application code, through communication link 1615 and communication interface 1614. Received program code may be executed by processor 1607 as it is received, and/or stored in disk drive 1610, or other non-volatile storage for later execution. Database 1632 in storage medium 1631 may be used to store data accessible by computer system 1600 via data interface 1633.

The disclosure includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A method for transforming an image frame based on a position of pupils of a viewer, the method comprising:
    obtaining, by a computing device, a first image frame having a set of color fields, wherein the first image frame corresponds to a first view perspective associated with a first position of the pupils of the viewer;
    determining, by the computing device, a second position of the pupils of the viewer;
    generating, by the computing device and based on the first image frame, a second image frame corresponding to a second view perspective associated with the second position of the pupils of the viewer, the generating comprising:
        calculating an eye velocity as a function of the first position of the pupils, the second position of the pupils and a time elapsed for the pupils of the viewer to get from the first position to the second position,
        calculating a shift value based on the eye velocity, and
        shifting one or more color fields of the set of color fields by the shift value; and
    transmitting, by the computing device, the second image frame to a near-eye display device to be displayed on the near-eye display device, wherein all six color fields of the second image frame are displayed on a same spot relative to the second position of the pupils of the viewer.

2. The method of claim 1, wherein the eye velocity is calculated with respect to the near-eye display device.

3. The method of claim 1, further comprising:
    receiving, by the computing device from an eye tracking device, data associated with the position of the pupils of the viewer, wherein the second position of the pupils is determined based on the data received from the eye tracking device.

4. The method of claim 1, wherein the first view perspective is also associated with a first head position of the viewer, the method further comprising:
    estimating, by the computing device, a second head position of the viewer; and
    generating, by the computing device, an intermediary warped image frame from the first image frame using the second head position of the viewer, wherein the second image frame is generated using the intermediary warped image frame.

5. The method of claim 4, wherein the second head position of the viewer is a rotation or a translation from the first head position of the viewer.

6. The method of claim 1, wherein the first position of the pupils and the second position of the pupils is associated with a same head position of the viewer, wherein the first position of the pupils is different than the second position of the pupils.

7. The method of claim 1, wherein a first position of an object on the first image frame is different than a second position of the object on the second image frame, wherein the six color fields are associated with the object.

8. The method of claim 1, wherein a position of an object on the first image frame is same as the position of the object on the second image frame, wherein the six color fields are associated with the object.

9. The method of claim 1, wherein the near-eye display device is a spatial light modulating display.

10. The method of claim 1, wherein the position of the pupils is determined with respect to pixels of the near-eye display device.

11. The method of claim 1, wherein the first image frame includes six color fields, and wherein all six color fields are shifted based on the first and second positions of the pupils of the viewer.

12. The method of claim 11, wherein each color field is shifted at a different shift value determined based on positions of the pupils of the viewer.

13. A system comprising:
one or more processors configured to execute instructions to:
obtain a first image frame having a set of color fields, wherein the first image frame corresponds to a first view perspective associated with a first position of pupils of a viewer;
determine a second position of the pupils of the viewer;
generate, based on the first image frame, a second image frame corresponding to a second view perspective associated with the second position of the pupils of the viewer, the generating comprising:
calculate an eye velocity as a function of the first position of the pupils, the second position of the pupils and a time elapsed for the pupils of the viewer to get from the first position to the second position,
calculate a shift value based on the eye velocity, and
shift one or more color fields of the set of color fields by the shift value; and
transmit the second image frame to a near-eye display device; and
a display device configured to:
display the second image frame, wherein all six color fields of the second image frame are displayed on a same spot relative to the second position of the pupils of the viewer.

14. The system of claim 13, further comprising:
an eye tracking device configured to:
track the pupils of the viewer; and
transmit data associated with a position of the pupils of the viewer to the one or more processors, wherein the second position of the pupils is determined based on the data received from the eye tracking device.

15. The system of claim 13, wherein the first view perspective is also associated with a first head position of the viewer, wherein the one or more processors are further configured to execute instructions to:

estimate a second head position of the viewer; and
generate an intermediary warped image frame from the first image frame using the second head position of the viewer, wherein the second image frame is generated using the intermediary warped image frame.

16. The system of claim 13, wherein the display device is a spatial light modulating display.

17. The system of claim 13, wherein the first position of the pupils and the second position of the pupils is associated with a same head position of the viewer, wherein the first position of the pupils is different than the second position of the pupils.

18. The system of claim 13, wherein a first position of an object on the first image frame is different than a second position of the object on the second image frame, wherein the six color fields are associated with the object.

19. The system of claim 13, wherein a position of an object on the first image frame is same as the position of the object on the second image frame, wherein the six color fields are associated with the object.

20. A non-transitory computer-readable medium having stored thereon a sequence of instructions which, when executed by one or more processors, causes the processors to execute a method for transforming an image frame based on a position of pupils of a viewer, the method comprising:
obtaining a first image frame having a set of color fields, wherein the first image frame corresponds to a first view perspective associated with a first position of the pupils of the viewer;
determining a second position of the pupils of the viewer;
generating, based on the first image frame, a second image frame corresponding to a second view perspective associated with the second position of the pupils of the viewer, the generating comprising:
calculating an eye velocity as a function of the first position of the pupils, the second position of the pupils and a time elapsed for the pupils of the viewer to get from the first position to the second position,
calculating a shift value based on the eye velocity, and
shifting one or more color fields of the set of color fields by the shift value; and
transmitting the second image frame to a near-eye display device to be displayed on the near-eye display device, wherein all six color fields of the second image frame are displayed on a same spot relative to the second position of the pupils of the viewer.

* * * * *